Figure 1:
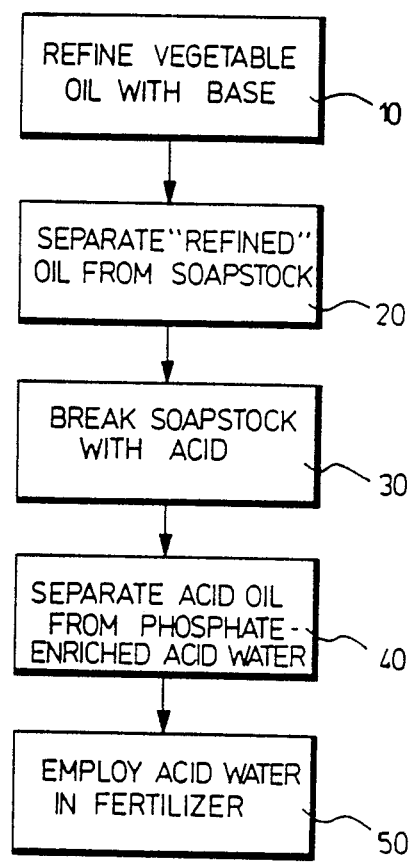

United States Patent [19]
Daniels

[11] Patent Number: 4,836,843
[45] Date of Patent: Jun. 6, 1989

[54] FERTILIZER PROCESS

[76] Inventor: Ralph S. Daniels, 226 Highland St., Worcester, Mass. 01609

[21] Appl. No.: 179,280

[22] Filed: Apr. 8, 1988

Related U.S. Application Data

[63] Continuation of Ser. No. 26,052, Mar. 16, 1987, abandoned, which is a continuation of Ser. No. 886,937, Jul. 21, 1986, abandoned, which is a continuation of Ser. No. 738,742, May 29, 1985, abandoned, which is a continuation of Ser. No. 575,455, Jan. 31, 1984, abandoned, which is a continuation-in-part of Ser. No. 572,202, Jan. 18, 1984, abandoned.

[51] Int. Cl.⁴ ............................ C05F 7/00; C11B 1/04
[52] U.S. Cl. ........................................... 71/25; 71/40; 71/41; 71/43; 71/64.1; 260/412.3; 260/424; 260/425
[58] Field of Search ............... 71/23, 25, 37, 40, 41, 71/43, 64.10; 260/417, 418, 424, 425, 412.3

[56] References Cited

U.S. PATENT DOCUMENTS

| | | | |
|---|---|---|---|
| 2,758,122 | 8/1956 | Clayton | 260/415 |
| 3,926,610 | 12/1975 | Kenton | 71/64.1 X |
| 4,118,407 | 10/1978 | Red et al. | 260/417 X |
| 4,179,457 | 12/1979 | Crawford | 260/417 X |
| 4,229,202 | 10/1980 | Mullerheim et al. | 71/64.1 X |

*Primary Examiner*—Donald R. Valentine
*Attorney, Agent, or Firm*—Blodgett & Blodgett

[57] ABSTRACT

A method of fertilizing soil comprising the steps of treating soapstock with an acid containing phosphorus compounds, separating the acid oil from the acid water, and using the resulting acid water as fertilizer, or fertilizer component. Such use is particularly effective in precision fertilizer delivery systems having small passages which would be adversely affected by insolubles.

34 Claims, 1 Drawing Sheet

FERTILIZER PROCESS

This application is a continuation of Ser. No. 07/026,052, filed Mar. 16, 1987, now abandoned; which was a continuation of Ser. No. 06/886,937, filed July 21, 1986; which was a continuation of Ser. No. 06/738,742 filed May 29, 1985 now abondoned; which was a continuation of Ser. No. 06/575,455, filed Jan. 31, 1984 now abondoned; which was a continuation-in-part of Ser. No. 26/572,202, filed Jan. 18, 1984.

Vegetable oil refining essentially involves the removal of free fatty avids (FFA) and gums (to a lesser extent) from the crude oil. The removal is accomplished by mixing the oil with a hot, aqueous caustic solution and centrifugally separating the reaction products from the "refined" oil. The water product, an alkaline mixture of saponified FFA and gums is referred to as soapstock.

The soapstock waste has commerical value because of the fatty acid content, but must be processed further in order to render it salable. Processing simply amounts to breaking or splitting the soap inot oil and water again by adding acid to approximately pH 1.5. After heating and mixing throughly, the acidulated soapstock is allowed to settle out. The oil that floats to the top is called "acid oil" and drawn off for sale usually as an animal feed supplement. The aqueous phase remaining is termed "acid water". Acid water is the final waste product and is discarded. However, there is a disposal problem. Sewer authorities at a bare minimum require that the acid water be neutralized (NaOH is added) before the waste is allowed to be dumped. Some states have more stringent pollution control and have forced companies out of business because of acid water disposal.

In 1982 a feasibility study was conducted to determine if better utilization of soapstock (higher value for the fatty acids in the acid oil) could be realized. The study was promising enough to warrant further development, and fomally commenced in Aug. 1983.

The initial goals for the development program were to produce a higher grade of fatty acid from th soapstock for use in an industrial soap solution and capturing the alkali stream used in the above for conversion to tri-sodium phosphate. However, after some marketing studies were done, I decided that it made more sense to make and market a liquid fertilizer concentrate from the aqueous phase of the acidulated soapstock rather than use the water for a TSP solution.

The fist fertilizer product to be made was a 20-20-20 formulation (NPK - nitrogen, phosphorus, potassium) as a concentrate that was equivalent to dissolving 4 pounds of dry commerical 20-20-20 in water to make 1 gallon. Laboratory tests supposedly demonstrated that there was no problem maintaining a stable solution at below freezing temperatures. However, at the time when the product was to be made in production and shipped in 25 gallon drums, a solubility problem arose. Crystalization was occuring at room temperature due simply to oversaturation. Since this problem was physical, there was no proactical solution.

The direction I took was a "back-to-basic" look at acidulating soapstock. Because of cost, sulfuric acid is used to split soapstock into acid oil and acid water. However, if fertilizer is the final objective, perhaps phosphoric acid can be used to acidulate—its 5 times higher cost justified by capturing all the phosphate in the water, thus providing the P in the standard NKP formulation. This had been tried once before and rejected when the water was analyzed for phosphate and only traces were found. However, the approach taken was to maintain the integrity of the fatty acid and, accordingly, acidulation was done only to pH 7. My initial experiments were disigned to acidulate the soapstock to pH 6, 5, 4, 3, 2, and 1.5 and then analyze both the acid oil and the acid water for phosphate. If this proved commerically feasible, I would then refine crude soybean oil with potassium hydroxide rather than the industry standard use of sodium hydroxide (NaOH is cheaper than KOH) and analyze for potassium in the water. I would then make a decision on the commerical use of KOH based on the amount captured in the water and thus providing the k component of the NPK formulation.

The results of the phosphoric acid acidulations showed that too much phosphate was tied up in the acid oil to warrant use economically. However, the observation that most interested me was that the amount of phosphate in the acid oil was essentially constant and the additional acid used to reduce the pH was accordingly found in the water as increasing concentration of phosphate. The percentage of phosphate in the oil ranged from 2.3 to 3.0 on a weight-weight basis. Based on this result, I hypothesized using sulfuric acid first to acidulate to a given pH and then using phosphoric acid to reduce the pH to 1.5. The above acidulation experiments were repeated but sulfuric acid was used to bring the pH to 6 and then phosphoric acid used to reduce pH 1.5; sulfuric acid to pH 5 then phosphoric acid to pH 1.5 and so on. These results proved even more interesting.

The analysis of the acid oil for phosphate and acid water for phosphate and sulfate showed that the amount of phosphate in the oil again remained constant, but it was only present in greatly reduced amounts, 0.57% to 0.82% on a weitht-weight basis. As would be expected, the respectively increasing amount of sulfuric acid found its way into the water as increased percentage of sulfate, and the phosphoric acid as decreased amounts of phosphates. However, with such a small amount of phosphate trapped in the oil, the process was commercially feasible since the bulk was dissolved in the water. It had the commercial advantage of using less sulfuric acid to acidulte and an almost complete capture of phosphate—a commercial advantage in making fertilizer.

As if that were not enough, the most important discovery was made in reviewing the results quantitatively to cross check the exact amounts used against the exact amounts found. What I discovered was that in every case there was were more phosphate in the water than was used in the acidulation with phosphoric acid. At first I questioned the laboratory methods and results. I then analyzed the soapstock before acidulation for phosphate. This provided the answer. The soapstock contained phosphorus bearing compouds that were removed from the crude soybean oil during the refining process (gums, etc.) that together with the phosphoric acid added in minute amounts to the crude oil (500 ppm) to facilitate gum removal were released into the acid water during the acidulation process. This discovery greatly enhances the economics of the liquid fertilizer since phosphate is the most expensive component of the NPK formulation. 1–2% phosphate was found in the soapstock and a comparable amount was found in the acid oil and water. This is a significant amount in that a 1 pound per gallon concentration of dry commercial 20-20-20 fertilizer in water is approximately 1.9% by weight.

This discovery suggested analysis of athe acid water in conventional soapstock processing (with sulfuric acid) to determine if the phosphate is present. Analysis of the acid water from conventional soybean processing indicated the presence of sufficient phosphate to justify use of the acid water as a fertilizer after reducing the acidity, especially with a nutrient-type base such as urea or ammonium hydroxide.

After realizing the commercial significance of the phosphate discovery, it logically followed to analyze the acid water for nitrogen. It was found to be present at 0.16% which, although a small amount by itself, does represent 8-10% of the organic nitrogen requirement in the heretofore mentioned 1 pound per gallon of 20-20-20.

Therefore, the significance of these experiments, conclusions and discoveries is the practical and commercial use of a waste product that, otherwise, requires chemicals and equipment to treat, is a pollution control problem, and costs money to throw away.

The fertilizer, depending upon the final formulation (i.e., the ingredients added and their respective concentrations), has wide use for most agricultural crops. In addition, when properly formulated and packaged has special advantage in the greenhouse grown plant industry. This industry requires a higher quality feritilizer for specific application. Presently, the grower is dissolving solid granular fertilizer in a concentration of 1 pound per gallon of water and using this concentrate to feed the daily watering with a precise quantity of nutrients. There are several disadvantages inherent in using dry fertilizers in this way. First the fertilizer must be mixed until it is completely dissolved (this takes time and is inconvenient), secondly and most important, the watering systems used in the greenhouse have become very precise and employ tubes and fittings of very small diameters, hypodermic syringe like. They tend to get clogged up with insolublesd present in greater or lesser degree with all solid fertilizers. A liquid based fertilizer not only eliminates the above problems, but also contains less "fill" or superfluous ingredients that tend to compromise the integrity of the growing medium. Most of the "fill" is water.

The product to be manufactured is a supersaturated solution using acid water as the starting vehicle, and adding sufficient Nitrogen and urea and/or ammonium nitrate; Phosphoric acid; Potassium hydroxide for K and other micronutrients as salts or chelates (Sulfur a present in varying degrees depending upon how much is used/required when acidulation is done) to proper concentrations to make a desired final product, i.e., 20-20-20, 5-10-30, etc.

The supersaturated solutions will be formulated at a concentration equivalent to 5 pounds per gallon at a temperature of approximately 100 degrees F (the ingredients are soluble at this temperature) and packaged in 5 gallon containers (bag in box). The 5 gallon containers will contain the equivalent of 25 pounds of dry fertilizer: the industry uses 25 pounds bags. When the temperature drops, the solution will crystalize out as expected. However, this does not pose a problem any more. This grower need only pour the "slurry" into a container and add water to make 25 or 50 gallons as he currently does with one or two 25 pound bags to 25 to 50 gallons of water. The crystals dissolve almost instantly, thus producing a concentrate of 1 pound per gallon with no time needed for mixing and no suspended particles.

The best way to produce the product initially would be to refine the crude oil with potassium hydroxide; acidulate the potassium soapstock with sulfuric acid to pH 7 and below (depending upon how much sulfate is required) and finish the acidulation with phosphoric acid to pH 1.5. The product would then be analyzed for NPK and nutrient would be added to a desired final fourmulation.

FIG. 1 is a diagram of a process according to the present invention.

I claim:

1. A method fo fertilizing plants using precision fertilizer delivery systems having small passages which would be adversely affected by insolubles, comprising the steps of:
    (a) treating soapstock with an acid to form an acid oil phase and an acid water phase,
    (b) separating the resulting acid oil phase from the resulting acid water phase,
    (c) treating the acid water by adding sufficient materials from the group consisting of: a nitrogen source, a phosphorous source, a potassium source, a micronutrient salt source, and a micronutrient chelate source to make an approprist fertilizer concentration for said plants, and
    (d) feeding the treated acid water through the delivery system to the plants.

2. A method as recited in claim 1, wherein at least a portion of the acid is phosphoric acid.

3. A method as recited in claim 1, wherein step (a) is accomplished by bringing the soapstock to a first pH using sulfuric acid and then taking the soapstock from the first pH to approximately pH 1.5 using a second acid, at least a portion of which is phosphoric acid.

4. A method as recited in claim 3, wherein the second acid is phosphoric acid.

5. A method as recited in claim 1, wherein the soapstock is the result of refining crude vegetable oil with potassium hydroxide.

6. A method as recited in claim 1, wherein the acid water is treated with a base after separation from the acid oil.

7. A method as recited in claim 6, wherein the base is chosen from the group consisting of ammonium hydroxide and urea.

8. An integrated processing method for an oil-bearing vegetable, comprising the steps of:
    (a) harvesting the oil-bearing vegetable from a growing area, and extracting crude oil by knoon means,
    (b) separating regined vegitable oil from soapstock by treating the crude oil with base,
    (c) treating the soapstock with an acid to form an acid oil phase and an acid water phse,
    (d) separating the resulting acid oil from the resulting acid water,
    (e) treating the acid water by adding sufficient materials from the group consisting of: a nitrogen source, a phosphorous source, a potassium source, a micronutrient salt source, and a micronutrient chelate source to make an appropriate fertilizer concentration for said plants, and
    (f) returning the treated acid water to the growing area as fertilizer.

9. A methos as recited in claim 8, wherein at least a portion of the acid is phosphoric acid.

10. A method as recited in claim 8, wherein step (c) is accomplished by bringing the soapstock to a first pH using a sulfuric acid and then taking the stock from the first pH to approximately pH 1.5 using a second acid, at least a portion of which is phosphoric acid.

11. A method as recited in claim 10, wherein the second acid is phosphoric acid.

12. A method as recited in claim 8, wherein the soapstock is the result of refining crude vegetable oil with potassium hydroxide.

13. A method as recited in claim 8, wherein the acid water is treated with a base after separation from the acid oil.

14. A method as recited in claim 13, wherein the base is choosen from the group consisting of ammonium hydroxide and urea.

15. A method of processing vegetable oils comprising the steps of harvesting oil-containing vegetables from a growing area, extracting crude vegetable oil from the vegetables, and forming a soapstock by refining the crude vegetable oil with base; separating the refined vegetable oil from the soapstock; treating the resulting soapstock with an acid to form a mixture of an acid water aqueous phase and an acid oil; separating the resulting acid oil from the resulting acid water aqueous phase; characterized by the steps of:
(a) reducing the acidity of the acid water aqueous phase with a nutrient-containing base; and
(b) applying the resulting aqueous phase as a fertilizer to soil or growing plants.

16. A method as recited in claim 15, wherein the acid water aqueous phase is neutralized with a nutrient-containing base before application as a fertilizer.

17. A method as recited in claim 16, wherein the nutrient base used to neutralize the acid water aqueous phase is a nitrogen containing base chosen from the group consisting of ammonia, ammonium hydroxide, and urea.

18. A method as recited in claim 16, wherein the nutrient base used to neutralized the acid water aqueous phase is potassium hydroxide.

19. A method as recited in claim 15, wherein the acid water aqueous phase is neutralized by a combination of nitrogen containing base and potassium hydroxide, the proportion chosen depending on the desired proportion of nitrogen to potassium in the resulting fertilizer.

20. A method as recited in claim 15, wherein the crude vegetable oil is refined with potassium hydroxide.

21. A method as recited in claim 15, wherein the acid used to treat th resulting soapstock is phosphoric acid.

22. A method as recited in claim 15, wherein the soapstock is treated by bringing the soapstock to a first pH of less than 7 using non-phosphoric acid and then taking the soapstock from the first pH to approximately pH 1.5 using a second acid in an amount to maximize the phosphate content of the acid water, at least a portion of the second acid being phosphoric acid.

23. A method as recited in claim 15, further comprising the step of:
before applying the aqueous phase as a fertilizer testing the aqueous phase for nutrients and enriching it as needed.

24. An improved method of processing oil obtained from oil-bearing vegetables, in which the vegetables are harvested from the growing area and crude oil extracted by known means, characterized by the steps of:

(a) refining the crude oil with potassium hydroxide to form refined oil and soapstock, (b) separting the refined vegetable oil from the soapstock,
(c) treating the resulting soapstock with an acid to form a mixture of acid water and acid oil by bringing the soapstock to a first pH using a non-phosphoric acid and then taking the soapstock from the first pH to approximately pH 1.5 using a second acid in an amount to maximize the phosphate content of the acid water, at least a portion of the second acid being phosphoric acid,
(d) separting the resulting acid oil from the resulting acid water,
(e) treating the acid water with a nitrogen containing base after separation from the acid oil, the base being chosen from the group consisting of ammonium hydrroxide and urea, and
(f) returning the treated acid water to the growing area as a component of fertilizer, supplemented if necessary with additional nutrients.

25. A method of processing soybean oils comprising the steps of harvesting soybeans from a growing area and extracting crude oil from the soybeans in known manners and forming a soapstock by refining the crude oil with base; separting the refined oil from the soapstock; treating the resulting soapstock with an acid to form a mixture of an acid water aqueous phase and an acid oil; separating the resulting acid oil from the resulting acid water aqueous phase; characterized by the steps of:
(a) reducing the acidity of the acid water aqueous phase with a nutrient-containing base; and
(b) applying the resulting phase as a fertilizer to soil or growing plants.

26. A method as recited in claim 25, wherein the acid water aqueous phase is neutralized with a nutrient-containing base before application as a fertilizer.

27. A method as recited in claim 26, wherein the nutrient base used to neutralize the acid water aqueous phase is a nitrogen-containing base chosen from the group consisting of ammonia, ammonium hydroxide, and urea.

28. A method as recited in claim 26, wherein the nutrient base used to neutralize the acid water aqueous phase is potassium hydroxide.

29. A method as recited in claim 25, wherein the acid water aqueous phase is neutralized by a combination of nitrogen-containing base and potassium hydroxide, the proportion chosen depending on the desired proportion of nitrogen to potassium in the resulting fertilizer.

30. A method as recited in claim 25, wherein the crude oil is refined with potassium hydroxide.

31. A method as recited in claim 25, wherein the acid used to treat the resulting soapstock is phosphoric acid.

32. A method as recited in claim 25, wherein the soapstock is treated by bringing the soapstock to a first pH of less than 7 using sulfuric acid and then taking the soapstock from the first pH to approximately pH 1.5 using a second acid in an amount to maximize the phosphate content of the acid water, at least a portion of the seocond acid being phosphoric acid.

33. A method as recited in claim 25, further comprising the step of:
before applying the aqueous phase as a fertilizer, testing the aqueous phase for nutrients and enriching it as needed.

34. An improved method of processing oils obtained from soybeans, in which the soybeans are harvested from the growing area and crude oil extracted by known means, characterized by the steps of:
  (a) refining the crude oil with potassium hydroxide to form refined oil and soapstock,
  (b) separating the refined vegetable oil from the soapstock,
  (c) treating the resulting soapstock with an acid to form a mixture of acid water and acid oil by bringing the soapstock to a first pH using a non-phosphoric acid and then taking the soapstock from the first pH to approximately pH 1.5 using a second acid in an amount to maximize the phosphat content of the acid water, at least a portion of the second acid being phosphoric acid,
  (d) separating the resulting acid oil from the resulting acid water,
  (e) treating the acid water with a nitrogen-containing base after separation form the acid oil, the base being chosen from the group consisting of ammonium hydroxide and urea, and
  returning the treated acid water to the growing area as a component of fertilizer, supplemented if necessary with additional nutrients.

* * * * *